US009116974B2

(12) United States Patent
Heit et al.

(10) Patent No.: US 9,116,974 B2
(45) Date of Patent: *Aug. 25, 2015

(54) SYSTEM AND METHOD FOR CLUSTERING DATA IN INPUT AND OUTPUT SPACES

(71) Applicant: Robert Bosch GmbH, Stuttgart (DE)

(72) Inventors: Juergen Heit, Sunnyvale, CA (US); Sanjoy Dey, Minneapolis, MN (US); Soundararajan Srinivasan, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 208 days.

This patent is subject to a terminal disclaimer.

(21) Appl. No.: 13/833,022

(22) Filed: Mar. 15, 2013

(65) Prior Publication Data
US 2014/0280144 A1    Sep. 18, 2014

(51) Int. Cl.
*G06F 17/30* (2006.01)

(52) U.S. Cl.
CPC .... *G06F 17/30598* (2013.01); *G06F 17/30705* (2013.01)

(58) Field of Classification Search
CPC .......... G06F 17/30598; G06F 17/3053; G06F 17/30705; G06F 17/30595; G06F 17/30864; G06F 17/277; G06F 17/30011; G06F 17/30637; G06F 17/30657; G06F 17/3071; G06F 19/22; G06F 19/322; G06F 3/04842; G06F 17/148; G06F 17/2211
USPC ............ 707/737, 748, 738, 769, 788, E17.03, 707/E17.071, E17.082, 749, 739, 722, 741, 707/E17.091, E17.084, E17.046, E17.008; 704/239, 251, 245, 236; 706/45, 14, 706/12, 52
See application file for complete search history.

(56) References Cited
U.S. PATENT DOCUMENTS 5,263,120 A * 11/1993 Bickel .............................. 706/62
5,442,778 A *  8/1995 Pedersen et al. ....... 707/E17.091
5,787,422 A *  7/1998 Tukey et al. .......... 707/E17.091
(Continued)

OTHER PUBLICATIONS

Andriy Shepitsen; Jonathan Gemmell; Bamshad Mobasher; and Robin Burke—"Personalized recommendation in social tagging systems using hierarchical clustering "—Proceeding RecSys '08 Proceedings of the 2008 ACM conference on Recommender systems; Oct. 23-25, 2008—pp. 259-266.*
(Continued)

*Primary Examiner* — Anh Ly
(74) *Attorney, Agent, or Firm* — Maginot Moore & Beck LLP

(57) ABSTRACT

A method of clustering a plurality of documents having input and output space data is disclosed that uses both input and output space criteria. The method can include aggregating documents into clusters based on input and/or output space similarity measures, and then refining the clusters based on further input and/or output space similarity measures. Aggregating the documents into clusters can include forming a hierarchical tree based on the input and/or output space similarity measures where the hierarchical tree has a root node, branching into intermediate nodes, and branching into leaf nodes covering individual documents, where the hierarchical tree includes a leaf node for each document of the plurality of documents. The method can then include forming a forest of sub-trees of the hierarchical tree based on cluster criteria. Textual and numeric similarity measures can be used depending on the type and distribution of data in the input and output spaces.

17 Claims, 10 Drawing Sheets

(56) References Cited

U.S. PATENT DOCUMENTS

| | | | |
|---|---|---|---|
| 6,654,743 B1* | 11/2003 | Hogg et al. | 707/E17.091 |
| 6,816,175 B1* | 11/2004 | Hamp et al. | 715/854 |
| 8,209,339 B1 | 6/2012 | Tong | |
| 8,954,440 B1* | 2/2015 | Gattani et al. | 707/738 |
| 2002/0161854 A1* | 10/2002 | Wojcik | 709/218 |
| 2003/0061200 A1* | 3/2003 | Hubert et al. | 707/3 |
| 2004/0064438 A1* | 4/2004 | Kostoff | 707/1 |
| 2006/0242140 A1* | 10/2006 | Wnek | 707/5 |
| 2006/0242190 A1* | 10/2006 | Wnek | 707/102 |
| 2007/0021918 A1* | 1/2007 | Natsoulis et al. | 702/19 |
| 2007/0110715 A1* | 5/2007 | Grimaldi | 424/85.6 |
| 2007/0112755 A1* | 5/2007 | Thompson et al. | 707/5 |
| 2007/0112867 A1* | 5/2007 | Evans et al. | 707/200 |
| 2007/0112898 A1* | 5/2007 | Evans et al. | 707/205 |
| 2008/0010605 A1* | 1/2008 | Frank | 715/765 |
| 2008/0114750 A1* | 5/2008 | Saxena et al. | 707/5 |
| 2008/0205774 A1 | 8/2008 | Brinker et al. | |
| 2008/0319941 A1 | 12/2008 | Gollapudi | |
| 2009/0068110 A1* | 3/2009 | Shang et al. | 424/9.2 |
| 2009/0130083 A1* | 5/2009 | Simard et al. | 424/94.63 |
| 2009/0204582 A1* | 8/2009 | Grandhi et al. | 707/3 |
| 2009/0287668 A1* | 11/2009 | Evans et al. | 707/4 |
| 2009/0307213 A1* | 12/2009 | Deng et al. | 707/5 |
| 2010/0223276 A1* | 9/2010 | Al-Shameri et al. | 707/769 |
| 2010/0228693 A1* | 9/2010 | Dawson et al. | 706/12 |
| 2011/0125751 A1* | 5/2011 | Evans | 707/737 |
| 2011/0173197 A1* | 7/2011 | Mehta et al. | 707/737 |
| 2012/0284270 A1* | 11/2012 | Lee et al. | 707/737 |
| 2013/0006996 A1* | 1/2013 | Kadarkarai | 707/738 |
| 2013/0041877 A1* | 2/2013 | Parthasarathy et al. | 707/706 |
| 2013/0159235 A1* | 6/2013 | Hatami-Hanza | 706/46 |
| 2013/0311467 A1* | 11/2013 | Galle et al. | 707/737 |
| 2014/0280144 A1* | 9/2014 | Heit et al. | 707/737 |
| 2014/0280145 A1* | 9/2014 | Heit et al. | 707/737 |
| 2014/0344279 A1* | 11/2014 | Shah et al. | 707/738 |

OTHER PUBLICATIONS

Ying Zhao, and George Karypis—"Clustering in Life Sciences"—Functional Genomics—Methods in Molecular Biology vol. 224, 2003, pp. 183-218.*

International Search Report and Written Opinion corresponding to PCT Application No. PCT/US2014/023729, mailed Jul. 31, 2014 (12 pages).

Aggarwal et al., "Mining Text Data", Springer 2012 (63 pages).

* cited by examiner

| Question | Response | Risk Value |
|---|---|---|
| 1. Welcome John Doe. Is this your name?<br>　1- Yes　2 – No | 1 | 0 |
| 2. Please describe your ethnic background:<br>　1–Black　2–Hispanic<br>　3–Asian　4–White　5–Other | 4 | 0 |
| 3. Do you live alone?<br>　1- Yes　2 – No | 1 | 0 |
| 4. Do you smoke?<br>　1- Yes　2 – No | 2 | 0 |
| 5. Did you check your blood sugar in the past 24 hours?<br>　1- Yes　2 – No | 1 | 1 |
| 6. Was your most recent test a fasting test (nothing to eat for 8 hours or more)?<br>　1- Yes　2 – No | 2 | 1 |
| 7. What was your most recent blood sugar? (Please use the arrows to input your blood sugar) | 234 | 2 |
| A non-fasting blood sugar between 181 and 299 is generally considered to be higher than normal. Remember to take your medications. | | |
| Also call <nurse name> if you continue to have high blood sugar levels. | | |
| 8. A geography questions for you. In which country are these cities located: Adelaide, Perth, Darwin and Melbourne?<br>　1–England　　2–Australia<br>　3–Argentina　4–Canada | 3 | 0 |
| No, they're all in Australia! | | |
| Thanks for answering today's questions. You'll get a new session tomorrow. Please press "Continue" to complete today's session. | | |

Figure 2

| Word\Question | What | Please | is | your | blood | sugar | enter | too | high |
|---|---|---|---|---|---|---|---|---|---|
| Q1 | 1 | | 1 | 1 | 1 | 1 | | | |
| Q2 | | 1 | | 1 | 1 | 1 | 1 | | |
| Q3 | | | 1 | 1 | 1 | 1 | | 1 | 1 |

Figure 4

SYSTEM AND METHOD FOR CLUSTERING DATA IN INPUT AND OUTPUT SPACES

BACKGROUND OF THE INVENTION

This patent relates to the field of information systems and data mining, and more particularly to a method for aggregating data by considering both the input and output properties of the data.

There has been an explosive growth in the amount of available data in the last decade. The fast growth pace has far outstripped the growth of experts who are able to analyze this data. Hence, there is a growing demand for automated tools for data analysis. One way of analyzing data is to cluster the data. Clustering consolidates information in the data for abstraction, compactness, removal of redundant information, etc. While there are hundreds of approaches to clustering available in textbooks and commercial solutions, most methods are only concerned with homogenous data types (variables). A few methods that can cluster heterogeneous data types produce clusters with heterogeneous variables in the same cluster. Some data processing applications, such as dimensionality reduction, are designed to work with data clusters with homogeneous data.

It would be desirable to have a method of clustering heterogeneous data types in order to produce clusters such that within each cluster the data types are homogeneous.

SUMMARY OF THE INVENTION

A computer automated method of clustering a plurality of documents is disclosed where each document includes input space data and output space data. For each document in the plurality of documents, the method includes reading the input space data of the document from memory or storage; computing an input space similarity measure between the document and other documents of the plurality of documents; aggregating the document into a first plurality of clusters based on the input space similarity measure; and storing the first plurality of clusters in a database. The method also includes, for each cluster in the first plurality of clusters, reading the output space data of the documents in the cluster; computing an output space similarity measure for the plurality of documents in the cluster; and maintaining or subdividing the current cluster in the first plurality of clusters based on the output space similarity measure.

The input space similarity measure can be a textual similarity measure. Computing an input space similarity measure can include generating a document versus word matrix. Computing an input space similarity measure can include retrieving a stop-words list from memory or storage, stripping away words from the input space data of each document using the stop-words list, and then generating a document versus word matrix.

The output space similarity measure can be a numeric similarity measure. Computing an output space similarity measure can include determining an output space type and/or distribution for each of the plurality of documents in a cluster. Documents with different output space types and/or distributions can be aggregated into different clusters that each have the same output space type and/or fir the same output space distribution.

Aggregating the documents into a first plurality of clusters can include forming a hierarchical tree based on the input space similarity measures. The hierarchical tree has a root node covering all of the plurality of documents, branching into intermediate nodes covering subsets of the plurality of documents, and branching into leaf nodes covering individual documents of the plurality of documents, where the hierarchical tree includes a leaf node for each document of the plurality of documents. The method then includes computing a node similarity measure for each node of the hierarchical tree; retrieving a node similarity threshold that is less than the node similarity measure of the leaf nodes of the hierarchical tree; and performing a graph traversal of the hierarchical tree, for example depth first search, starting with the root node to form a forest of sub-trees of the hierarchical tree. The forest of sub-trees can be formed by comparing the node similarity measure for the current node in the depth first search with the node similarity threshold.

If the node similarity measure of a current node is equal to or greater than the node similarity threshold, the method can include storing the current node as a cluster in the first plurality of clusters, not proceeding further down the depth of the current branch of the hierarchical tree, and continuing the depth first search on the next branch of the hierarchical tree. If the node similarity measure of the current node is less than the node similarity threshold, the method can include continuing the depth first search further down the current branch of the hierarchical tree.

Computing an output space similarity measure and maintaining or subdividing the current cluster in the first plurality of clusters based on the output space similarity measure can include retrieving an output space similarity threshold, and for each cluster of the first plurality of clusters, performing a cluster subdividing process by computing an output space similarity measure for the current cluster, and comparing an output space similarity measure for the current cluster with the output space similarity threshold. If the output space similarity measure is equal to or greater than the output space similarity threshold, then maintaining the current cluster and continuing the cluster subdividing process with the next cluster of the first plurality of clusters. If the output space similarity measure is less than the output space similarity threshold, determining the type and distribution of the output space data for the documents in the current cluster, subdividing the current cluster into a refined plurality of clusters based on the output space type and distribution, replacing the current cluster in the first plurality of clusters with the refined plurality of clusters; and continuing the cluster subdividing process with the refined plurality of clusters in the first plurality of clusters.

The method can also include performing a combined selection process for each cluster of the first plurality of clusters. The combined selection process can include, for each cluster, computing an input space similarity measure, computing an output space similarity measure; and computing a combined selection value as a function of the input and output space similarity measures. If the combined selection value of the current cluster is equal to or greater than a combined selection criteria, then maintaining the current cluster in the first plurality of clusters. If the combined selection value of the current cluster is less than the combined selection criteria, then subdividing the current cluster of the first plurality of clusters based on the input and output space similarity measures; replacing the current cluster with the subdivided clusters, and repeating the combined selection process for each of the subdivided clusters.

A computer automated method of clustering a plurality of documents is disclosed where each document includes input space data and output space data. For each document in the plurality of documents, the method includes reading the input space data of the document; computing an input space similarity measure between the document and other documents of the plurality of documents; aggregating the documents into a first plurality of clusters based on the input space similarity measure; and storing the first plurality of clusters in a database. The method also includes performing a refining process for each cluster in the first plurality of clusters. The refining process can include reading the input and output space data of the documents in the cluster; computing an input space similarity measure for the plurality of documents in the cluster; computing an output space similarity measure for the plurality of documents in the cluster; computing a combined similarity measure based on the input and output space similarity measures; and maintaining or subdividing the cluster based on the combined similarity measure.

Maintaining or subdividing the cluster based on the combined similarity measure can include comparing the combined similarity measure to a combined selection criteria. If the combined similarity measure meets the combined selection criteria, then maintaining the current cluster in the first plurality of clusters. If the combined similarity measure does not meet the combined selection criteria, then subdividing the current cluster based on input and output space similarity measures; replacing the cluster in the first plurality of clusters with the subdivided clusters, and repeating the refining process for each of the subdivided clusters.

A computer automated method of clustering a plurality of documents is disclosed where each document includes input space data and output space data. The method includes, for each document in the plurality of documents, reading the input and output space data of the document; computing an input space similarity measure between the document and other documents of the plurality of documents; computing an output space similarity measure between the document and other documents of the plurality of documents; aggregating the documents into a plurality of clusters based on the input and output space similarity measures; and storing the plurality of clusters in memory or storage. Aggregating the documents into a plurality of clusters can include forming a hierarchical tree based on the input and output space similarity measures, the hierarchical tree having a root node covering all of the plurality of documents, branching into intermediate nodes covering subsets of the plurality of documents, and branching into leaf nodes covering individual documents of the plurality of documents. The hierarchical tree includes a leaf node for each document of the plurality of documents. Aggregating the documents into a plurality of clusters can further include computing a node similarity measure for each node of the hierarchical tree; and performing a depth first search of the hierarchical tree starting with the root node to form a forest of sub-trees of the hierarchical tree by comparing the node similarity measure for the current node in the depth first search with a node similarity threshold.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 2 shows an exemplary set of question and response data from a session of the medical monitoring system of FIG. 1;

FIG. 4 illustrates an exemplary document versus word matrix that can be used in determining textual similarity;

Figure 1:
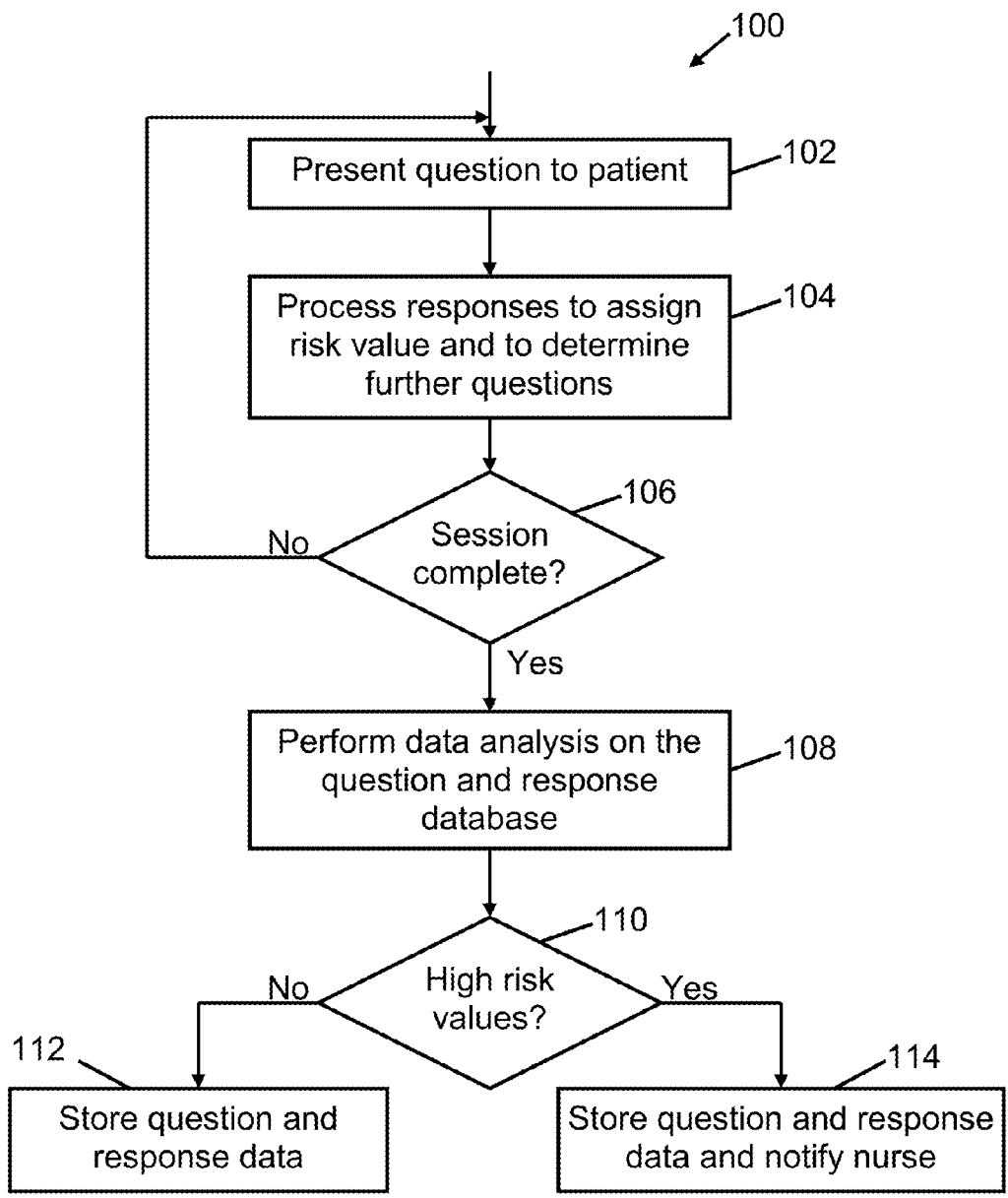
FIG. 1 illustrates a top level overview of an exemplary interactive electronic data gathering system that remotely administers questionnaires, in this embodiment to remotely monitor chronically ill patients, and the system can use data clustering algorithms to help with analyzing the gathered data.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF EXEMPLARY
EMBODIMENTS

Many data clustering algorithms use a metric to assess the homogeneity of samples within a cluster. The clustering algorithms typically consider sample homogeneity but not variable homogeneity. Both sample and variable (data) type homogeneity can be considered in the clustering process.

Data gathering is taking place in all aspects of the economy using available and new technology. For example, during on-line browsing and shopping, online retailers, other websites and service providers are monitoring activity of network users, collecting and storing activity data and analyzing that data to target advertisements, produce sales and generate revenue. There are also interactive query systems that generate data for analysis, such as helpdesk systems for customer service, or medical monitoring systems for patient health. There are numerous other systems and scenarios where data is collected and/or stored for analysis.

A medical monitoring system will be used as an example of one of the numerous systems for description of the data collection and analysis process. It will be appreciated that the principles explained will apply to data gathering and/or to data analysis applicable to numerous other systems. The principles for data gathering or data analysis described herein can be used independently or combined.

FIG. 1 illustrates a top level overview of an exemplary interactive electronic system to remotely administer questionnaires. Examples of questionnaires can include, but are not limited to, computer helpdesk applications or (tele-)medical monitoring and data gathering systems to remotely monitor chronically ill patients. Data clustering algorithms can help with analyzing the gathered data by aggregating the responses, possibly from different subjects, to semantically equivalent questions. The exemplary embodiment illustrated in FIG. 1 is directed to an interactive medical monitoring data gathering system 100 to remotely monitor chronically ill patients. The medical monitoring system 100 can conduct remote sessions with a patient through a remote patient interface device. During each session, at block 102, an automated computing system electronically presents queries related to the patient through a communications network to the remote patient interface. Excerpts from an exemplary set of queries presented during a session are shown in FIG. 2. The patient responds to each query by entering a response using an input device of the remote patient interface which is sent back through the communications network to the computing system. At block 104, the computing system stores the received patient responses in memory or storage, and processes the patient responses to determine further queries and to compute risk values based on system rules. Patient responses that indicate worsening conditions or risky behavior can be assigned a high risk value, while those indicating stable or improving conditions can be assigned a lower risk value. At block 106, if the session is not complete then the system 100 returns to block 102 to present further queries to the patient, and if the session is complete the system 100 proceeds to block 108. At block 108, the computing system determines if the computed risk values during the interactive session exceed a risk threshold to warrant further action. If the risk values do not exceed the risk threshold, then at block 112 the computing system 100 stores the query and response data from the session in memory or storage without notifying the nurse or other healthcare provider. If the risk values exceed the risk threshold, then at block 114 the system 100 stores the query and response data in memory or storage, generates a notification message and sends the notification to a nurse or other healthcare provider of the high risk values. When a notification is received, the healthcare provider can contact the patient and determine if hospitalization or other action is necessary. The stored query and response data from any session can be reviewed and analyzed at the convenience of or as needed by an authorized person.

The exemplary query and response data shown in FIG. 2 includes several types of information. The first question is used to establish the identity of the patient. This could also include entering a user identifier and/or password. Questions 2-4 are background questions. Questions 5-7 are patient health questions. Following question 7, some informational messages and instructions are presented to the patient. Question 8 is a random trivia question to entertain the patient and help keep their interest in the current session and encourage them to come back for future sessions.

The automated system 100 can help alleviate the data analysis burden on the healthcare provider of reviewing every session or interacting with every patient, which can allow the healthcare provider to focus on the patients currently in high risk situations and can help avoid unnecessary hospitalizations. The system 100 can also analyze and combine data stored over multiple sessions to look for trends or other patterns to be monitored. For example, if a significant number of patients have a pattern of continually rising blood sugar over a certain period of time followed by a hospital admission for a blood sugar related issue, then the system 100 can automatically monitor and analyze the collected data to look for this pattern and notify the healthcare provider when a similar pattern of continually rising blood sugar over a period of time is found for a patient. The healthcare provider can then take appropriate action to proactively intervene and try to break the pattern and prevent the need for hospital admission.

The question and response data collected by this exemplary system 100 and other systems can present various challenges, for example very sparse data, correlation among questions and appropriate feature selection. Some reasons for the sparse data are that the system can transmit different question sets to the patient during different sessions, and the received response values can be heterogeneous (categorical, ordinal, real, etc.). Some reasons for the correlation challenges can be follow-up questions intended to elicit more details with respect to a particular issue, and semantically equivalent questions that can elicit the same information. Typos in the response data, paraphrasing of the same questions and stripping away of irrelevant questions, such as the trivia question 8 shown in FIG. 2 can pose challenges for feature selection.

One method of analyzing the collected data is by document clustering. The computing system can use text metrics on the documents/queries to compare and cluster similar documents. For example, if the system processing determines that 80% of the same words appear in two queries, then it is likely that the two queries are intended to obtain the same information and the system can group the two documents in the same cluster. Also, the system can store lists of synonyms and if processing determines that two documents have the same words except that one uses a synonym for a word in the other document, then the system can group the two documents in the same cluster. There can be different degrees to how finely-grained or coarsely-grained the system processing clusters the documents together, sometimes referred to as hierarchical clustering. One problem with this method is that questions can be extremely high in text similarity but with one different word be intended to elicit completely different information. For example, "When was your computer made?" and "How was your computer made?" have only one different word but are intended to elicit completely different responses. However, by looking at the responses to the queries, or the type and distribution of responses for a cluster, system processing can separate these highly similar queries into different clusters. Thus, using both the input space, query/question information, and the output space, response/answer information, an automated data analysis system can more effectively cluster documents for analysis.

Figure 3:
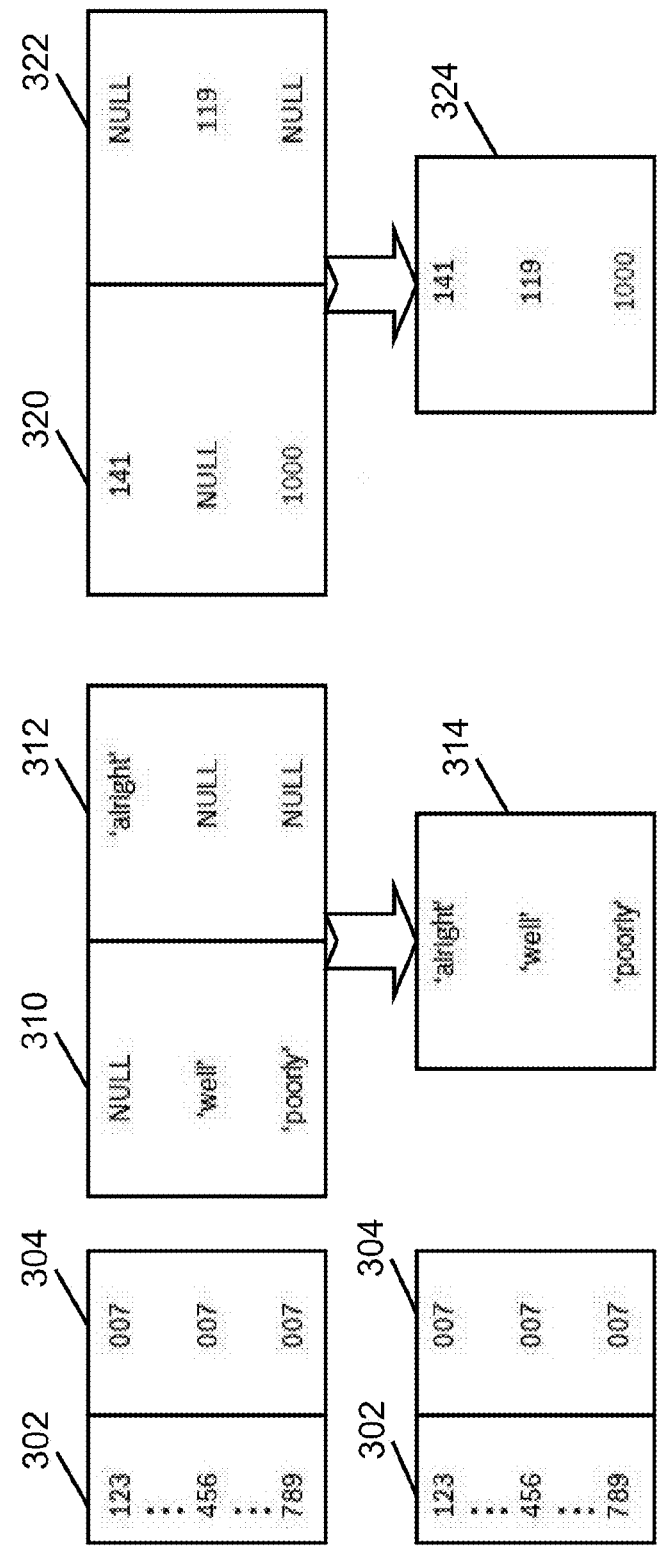
FIG. 3 illustrates an exemplary approach for aggregating question and response data.

FIG. 3 illustrates an exemplary approach for aggregating questions and responses. The upper blocks in FIG. 3 illustrate the question and response database stored in memory or storage before aggregation, and the lower blocks illustrate the question and response database after aggregation. Before aggregation, the database includes a session identifier 302, a responder or patient identifier 304, responses to a first question 310, responses to a second question 312, responses to a third question 320 and responses to a fourth question 322. The system processes the responder identifier 304 to determine that all of the responses are from the same patient, and processes the session identifier 302 to determine that the stored responses were collected in three different sessions with that patient. During session 123, the second and third questions were asked; during session 456, the first and fourth questions were asked; and during session 789, the first and third questions were asked. A "NULL" entry in the database means that the question was not asked during that session. The four questions are as follows:

Question 1: How do you do?
Question 2: How are you?
Question 3: What is your blood pressure today?
Question 4: What is today's blood pressure?

The first and second questions are semantically equivalent, and the third and fourth questions are semantically equivalent. During aggregation the system can process the questions to determine semantically equivalent questions, and then the system can aggregate the responses to semantically equivalent questions as shown in FIG. 3. The system processing can aggregate the responses to the first question 310 and to the second question 312 into first aggregated responses 314 as if they came from the same question. Likewise, the system processing can aggregate the responses to the third question 320 and to the fourth question 322 into second aggregate responses 324 as if they came from the same question. In this way different, basically redundant questions intended to elicit the same information can be used to make the system interactions more interesting for the patient, and the system processing can then aggregate the redundant questions and their responses during clustering.

If redundant questions are known beforehand by the system, then they can be aggregated with minimal analysis. However, data sets may be received for analysis by the system where it is not known if there are redundant questions. Various methods can be used by the computing system to cluster documents (question/response, or other stored data), for example a method can include one or more of the following: processing the questions to determine text similarity, processing the responses to determine text similarity, processing the responses to determine numerical similarity. An exemplary method that can be used by the system to determine numerical similarity is to calculate the distributions of the numerical responses to different queries and analyze and compare the distributions.

An exemplary clustering approach that uses the input space or queries, and the output space or responses, can include the following. The system can analyze the input space to calculate text similarity in the input space, and can then aggregate documents (query/response pairs) in a cluster based on the calculated text similarity. Then the system can analyze these clusters to determine questions that elicit the same type of information, similarity in the response or output space, and can aggregate the documents in more refined clusters based upon the analysis of the output space. FIG. 4 illustrates a word matrix that can be used in an exemplary implementation of this approach for determining whether to cluster the following three questions:

Question 1: What is your blood sugar?
Question 2: Please enter your blood sugar.
Question 3: Is your blood sugar too high?

FIG. 4 shows a document versus word matrix. In this matrix, the system breaks each question (or document) down into its individual words. A word may appear multiple times per document. For this reason, each row in the document versus word matrix represents a multi-set of words. Document versus word matrices can be used as a data representation to calculate textual similarity. The textual similarity comparison reveals that all three questions have some textual similarity and include the words "your," "blood" and "sugar." Thus, using textual similarity alone, the system may group all three questions in the same cluster. The first and second questions are intended to elicit the same response data, which is a numerical response of blood sugar level; however the third question is intended to elicit a non-numeric, 'yes' or 'no' response. By looking at the output space or response distribution for these questions, the system can determine to put the third question in a separate cluster. The textual similarity of the first two questions and the numerical similarity of their responses should cause the system to group the first two questions and their responses in the same cluster. Even though the third question is textually similar to the first two, its response values are clearly drawn from a different distribution (only 'Yes'=1 and 'No'=0) than the first two questions.

The benefits of this approach of looking at both the input and output spaces are that it can reduce the sparseness of the data, solve typos and paraphrasing issues, and reduce the data dimensionality.

Figure 5:
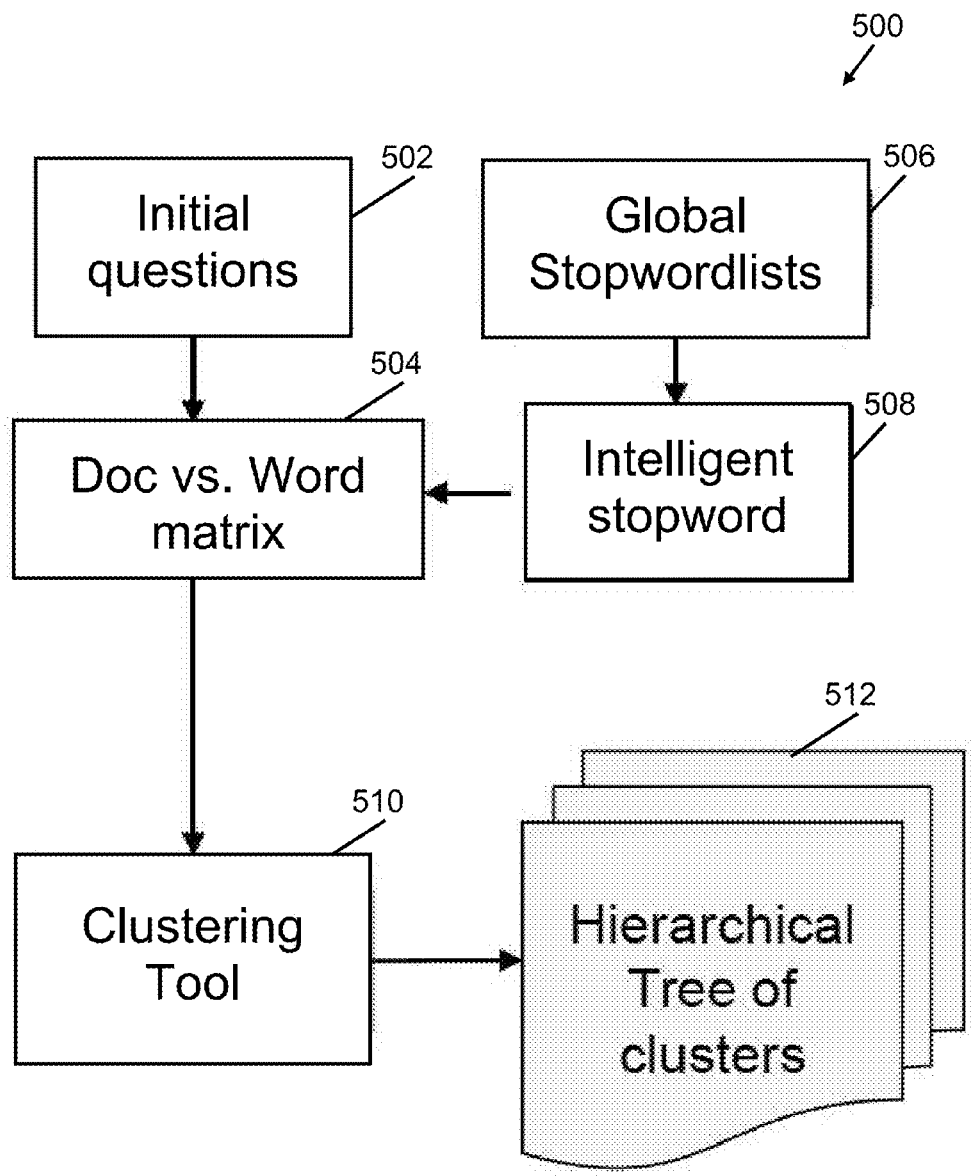
FIG. 5 shows an exemplary top-level flow diagram that can be used by a document clustering system.

FIG. 5 shows an exemplary top-level flow diagram 500 that can be used by an automated system for document clustering. At block 502, the system can analyze the initial questions or input space, and at block 504 the system can generate a document versus word matrix (see for example FIG. 4). At block 506 the system can analyze a global stop-word list that can be input and stored by the system. Stop-words can include, for example, articles (a, an, the, etc), pronouns, auxiliary verbs or other unnecessary words that can be removed from a sentence before constructing the document versus word matrices at block 504. Standard stop-word removal may not work well because several standard stop-words can be important for the data analysis. For example "what," "when," "why," "hour," "day, "week," etc. may be included in a standard stop-word list but may be important for system analysis because these words can be used during analysis to discriminate between the intentions of different queries. At block 508, the system pre-processing/post-processing analysis can be used to delete potentially important words from the global stop-words list, and to add any additional acceptable stop-words, to arrive at an intelligent stop-words list which is stored and used by the system for document analysis. At block 504, the intelligent stop-words list from block 508 can be used by the system in analyzing the stored documents and generating document versus word matrices. At block 510, the system analyzes the document versus word matrices from block 504 using various clustering methods to generate and output a hierarchical tree of clusters at block 512. The system can use clustering methods that include, for example, calculating similarity measures of the document input space to provide a tree of clusters with correlation measures based on the similarity measures used, for example textual similarity of the input space. The system can use K-means, Agglomerative, Bisecting K-means or other clustering algorithms. Various similarity measures can be used by the system clustering to normalize the document versus word matrix, for example term frequency-inverse document frequency (tf-idf) or cosine similarity measures.

Figure 6:
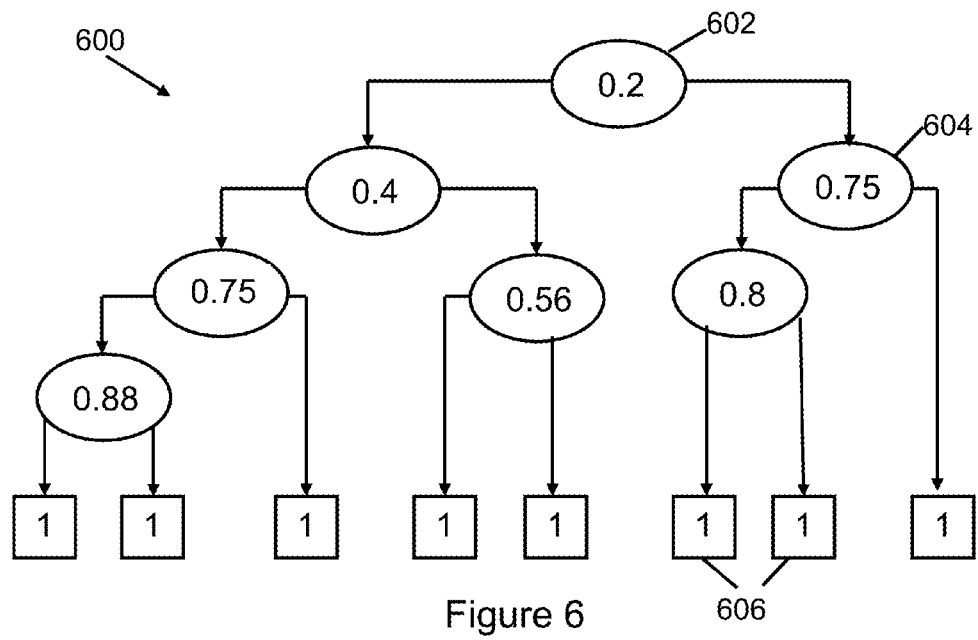
FIG. 6 shows an exemplary hierarchical tree of clusters including a root node, leaf nodes and several intermediate nodes between the root node and the leaf nodes.

FIG. 6 shows an exemplary hierarchical tree of clusters 600. The tree includes a root node 602, leaf nodes 606 and several intermediate nodes 604 between the root node 602 and the leaf nodes 606. Each node represents a cluster, and by going down the tree 600 from the root node 602 towards the leaves 606, the cluster size decreases. The root node 602 represents a cluster with all of the documents in one cluster. Each leaf node 606 represents a cluster with a single document. Thus, this exemplary tree 600 is for a set of eight documents.

The root node 602 and each of the intermediate nodes 604 includes a normalized similarity measure calculated by the system ranging from 0 to 1, of course other similarity measures and ranges can be used. In this example, the root node 602 has a similarity measure of 0.2, and the similarity measure of smaller more-correlated clusters gets progressively higher as the tree 600 is traversed towards the leaf nodes 606. Since each leaf node 606 only includes one document, its similarity value is 1.0.

Figure 7:
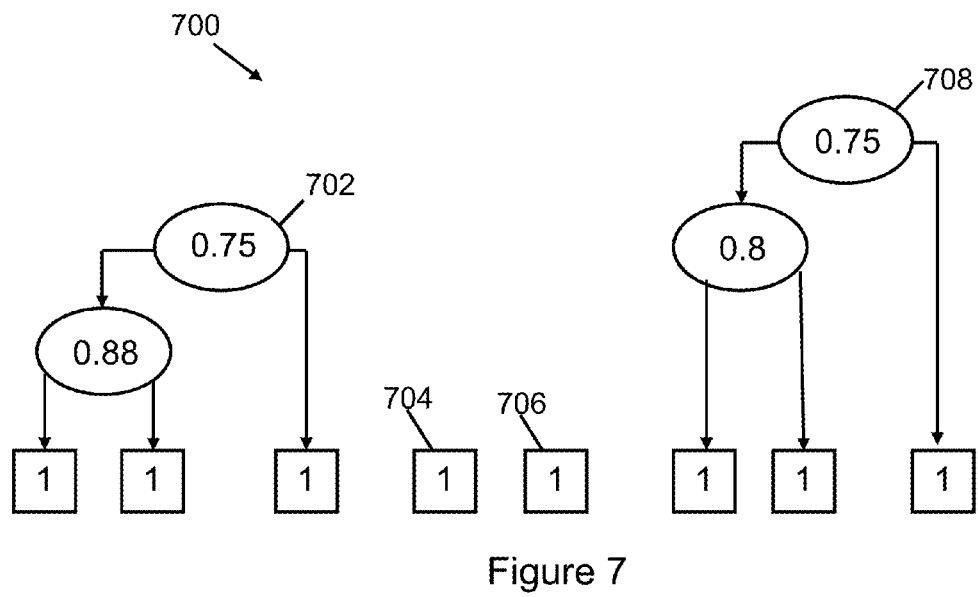
FIG. 7 shows a forest of sub-trees selected from the cluster tree of FIG. 6 when using a preselected similarity threshold.

The hierarchical tree of clusters 600 can be used by the system to select a forest of clusters using a similarity threshold. Text metrics by themselves are typically not sufficient to select a final high-quality set of clusters. The system can select a forest of clusters from the hierarchical tree of clusters 600 so that the forest: (1) covers all of the documents, and (2)

has each cluster be as large as possible and still meet or exceed the similarity threshold, i.e., the lowest similarity measure in the branch that exceeds the similarity threshold. FIG. 7 shows a forest of selected clusters 700 for the cluster tree 600 when using a similarity threshold of 0.7. The forest of clusters 700 includes four trees covering all of the documents with each root cluster having a similarity measure above the threshold of 0.7. The first root cluster 702 covers three documents and has a similarity value of 0.75. The second and third root clusters 704, 706 each cover a single document and thus each has a similarity value of 1.0. The fourth root cluster 708 covers three documents and has a similarity value of 0.75.

Each of the individual trees of the forest 700 can be examined by the system to assess the quality of that individual tree. The system can assess quality based on similarity measures of the document output space, responses/answers, for each of these trees, for example numerical or textual similarity of the output space can be used. Numeric similarity measures can measure how likely it is that two sets of responses are from the same distribution. The system can calculate numeric similarity of two response sets by various methods including, for example, t-test, analysis of variance (ANOVA), or by calculating the Kullback-Leibler divergence. The system can use depth first search (DFS) traversal of the tree based on both text similarity and numeric similarity of the document output space.

Figure 8:
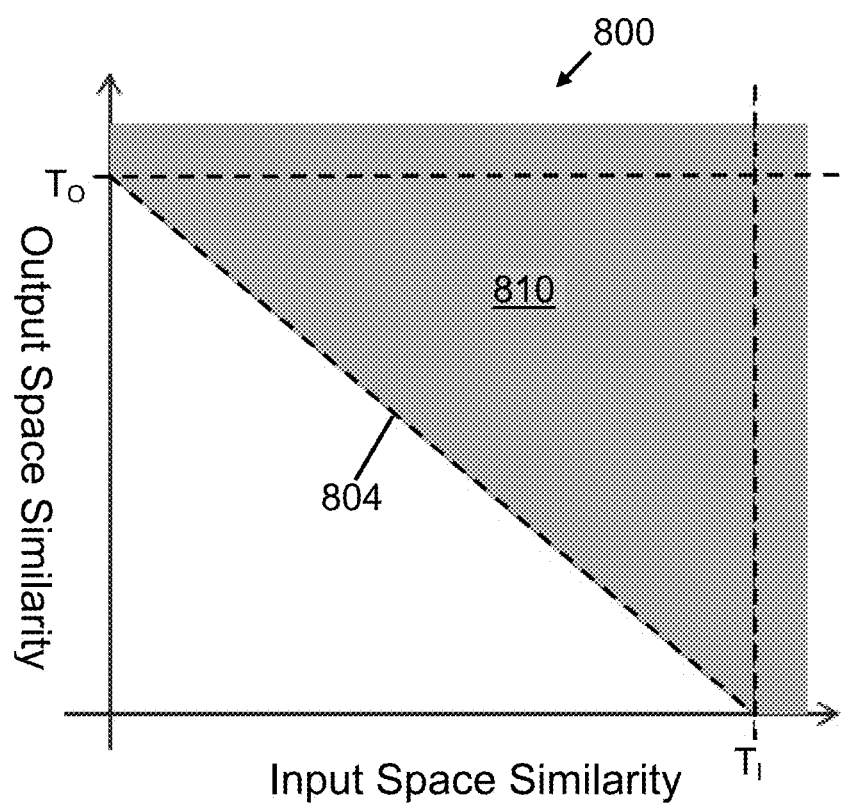
FIG. 8 shows a graph illustrating cluster selection of clusters in a high-quality cluster region determined based on input space similarity and output space similarity.

FIG. 8 shows a graph 800 illustrating cluster selection based on input space similarity and output space similarity. The horizontal axis measures the input space similarity with an input space similarity threshold $T_I$. The vertical axis measures the output space similarity with an output space similarity threshold $T_O$. The input and output space thresholds $T_I$, $T_O$ can be identified empirically by the system to identify high-quality clusters. The system can then plug the input and output space similarity measures into a function to determine the quality of the clusters and whether the cluster meets the criteria for a high-quality cluster.

FIG. 8 shows a simple linear function defining a boundary 804 of a high-quality cluster region 810. The function defining the boundary 804 for the high-quality cluster region 810 can be more complex or be defined by a higher order function of input space and output space similarity measures for the clusters. For example, if it is known that input space similarity is more important than output space similarity, then the system can use a boundary function that weights input space similarity higher in determining the high-quality cluster region 810.

Selections of document/question clusters that are as general as possible (comprise as many documents/questions as possible) and as narrow as necessary (meet the minimum similarity threshold) can be determined in various different ways including that described above. Some exemplary methods for cluster selection are described below. In the following examples, "text similarity" is used to refer to input space similarity and "numeric similarity" is used to refer to output space similarity. It should be understood that these are meant to be general terms encompassing any appropriate similarity measures for the input spaces and the output spaces of the documents.

The system can aggregate documents into clusters as much as possible in form of a cluster hierarchy. The system can then "backtrack" and subdivide these clusters if it has aggregated too aggressively. During a subsequent selection step the system can subdivide clusters by simply going down the cluster hierarchy tree. In this embodiment, the system initially only combines, starting with clusters that only contain 1 document and recursively combining clusters to contain more and more documents as the clustering tree is built up. The root node of the clustering tree, also known as a dendrogram, contains all of the documents. Subsequent selection step(s) can then subdivide these clusters by traversing the cluster hierarchy tree.

One way, as described above, is for the system to use a hierarchical clustering algorithm to create a tree of clusters, where the leaves of the tree represent single documents, and the inner nodes and root node of the tree represent collections of documents that are similar according to a computed measure of text or document similarity. A set of inner nodes and/or leaves within this tree can then be selected by the system that forms a forest of sub-trees such that all documents are covered. A document is covered by an inner node if there is a path in the cluster tree from the inner node representing the cluster to the leaf node representing the document in question. Each sub-tree in the forest can then be examined by the system with respect to the numerical similarity of all documents covered by the root node of that sub-tree. The system can consider a set of documents numerically similar if the likelihood that the responses/annotations associated with these documents have been sampled from the same probability distribution is larger than a previously set output threshold used by the system. In a second selection step, the system can select sub-trees of the sub-trees to find those smaller sub-trees that have the minimal text and numerical similarity to satisfy a combined selection criteria for document similarity. The combined selection criterion used by the system can analyze the separate (minimum) thresholds for both numerical and text similarity such as shown in FIG. 8. Alternatively, the combined selection criterion used by the system can be an affine function dependent on both text and numeric similarity, or some other arbitrary function taking both text and numerical similarity as input.

Alternatively, the system can calculate the combined selection criterion for both numerical and text similarity as the initial cluster tree is traversed. In this way, inner nodes of the initial hierarchical cluster tree are tested to determine if the input space and output space satisfy the combined selection criterion. In this way, one selection step that computes a combined input space and output space similarity measure can be used to determine the final forest of high-quality clusters.

In yet another alternative, the system can generate the initial hierarchical cluster tree based on a combined measure of text similarity and numeric similarity. Given document responses/annotations, the system can perform the initial clustering based on the combined textual and numeric selection criteria. This may lead to the generation of a different, possibly better suited hierarchy of documents. The system can then perform document cluster selection by traversing this combined hierarchy and selecting all clusters that meet a minimum threshold for the combined selection criterion. The similarity measure of each node having been computed by the system for the combined selection criterion.

The document clustering approach described above can be used to decrease the number of independent variables (aka "features") for data driven techniques such as automatic creation of statistical prediction or classification models. To this end, the number of independent variables can be reduced by merging responses to questions or annotations of documents that belong to questions/documents that are likely semantically equivalent. The assumption is that those questions/documents are semantically equivalent that meet the combined selection criterion for both text and numeric similarity. That means, documents that have similar textual representations and for which responses/annotations appear to be drawn from the same probability distribution can be considered semantically equivalent by the system. For some applications, however, merging responses/annotations may not be possible in a straight-forward fashion. Consider the following example:

The protocol of a customer service line for laptop computers may suggest that some but possibly not all customers are asked one or both of these two questions during a phone call:
  a. Is your power supply connected to a power outlet?
  b. Is your power supply connected to your laptop?

According to the combined selection criterion, the approach outlined above may suggest that the system merge the responses for question a. and b. Some customers, however, may have answered both questions during one phone call. For this reason, either the response to question a. or the response to question b. would be discarded by the system when aggregating the samples for the independent variables associated with the responses to these questions. In a final step, methods such as "sparse principal component" analysis can be used by the system to select which variable will be discarded when merging responses/annotations to create new independent variables/features.

Figure 9:
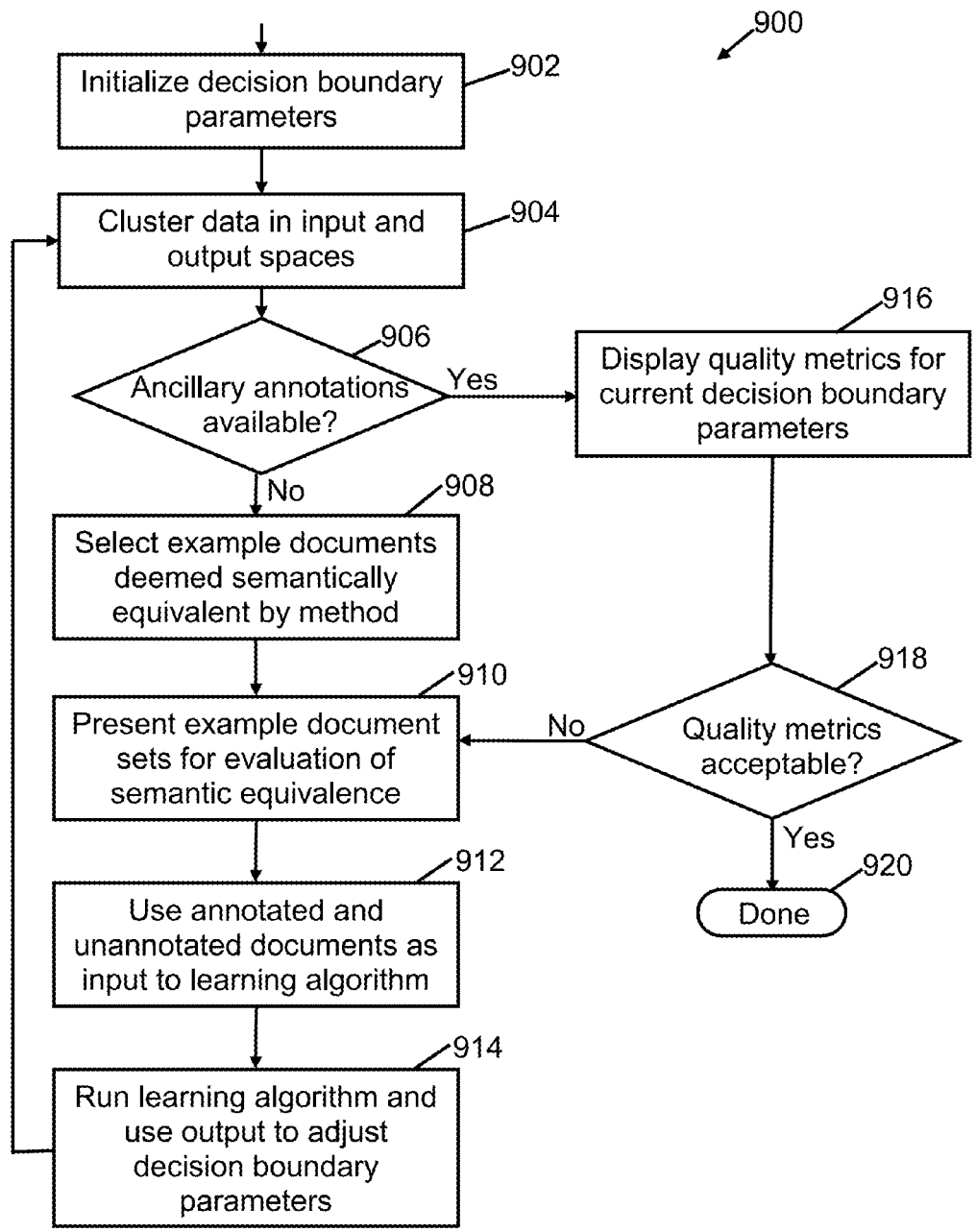
FIG. 9 is a flow chart illustrating an exemplary mode of operation of a system utilizing a method for clustering data in input and output spaces.

The discussion with regard to FIG. 8 describes an exemplary method for determining a decision boundary, and how it can be used for clustering data in input and output spaces. This decision boundary, which can be a simple linear or a more complex higher order polynomial function, determines a threshold for a combination of similarity measures. Parameters of this function can also be adjusted by an automated system such as a system illustrated by the exemplary flow diagram 900 shown in FIG. 9: This automated system can be implemented on the exemplary system illustrated in FIGS. 10 and 11.

At step 902, the system automatically initializes the parameters of the decision boundary function. In this step the parameters can even be initialized with automatically generated pseudo-random numbers. At step 904, the method for clustering data in input and output spaces is invoked with the current parameters of the decision boundary function. The result of step 904 is a forest of clustering trees. The trees of this forest determine which documents should be regarded as semantically equivalent.

At step 906, the system determines whether ancillary annotations or labels are available that provide information as to whether documents are truly semantically equivalent or not. If ancillary annotations are not available then control passes to step 908; otherwise control passes to step 916. Ancillary annotations may not be available for the initial pass, but will be added during an evaluation step described below.

At step 908, certain trees are selected by an automated procedure for evaluation. The documents in a tree are deemed semantically equivalent by the method for clustering data in input and output spaces. The automated selection mechanism can select a sub-set of the trees in the forest at random, or it can employ a different selection strategy.

At step 910, the documents clustered in the trees selected in step 908 are presented for evaluation. The evaluation can be performed by a human using a computer system. The evaluator marks, for example by clicking on check-boxes in a web page, which documents are semantically equivalent and which are not equivalent. In this way, pairs of documents are annotated with additional information as to whether documents are semantically equivalent or not. These annotations are also known as "ground truth" or "labels." At step 912, the documents together with the labels are used as input to a semi-supervised machine learning algorithm. Semi-supervised learning algorithms process the data samples with the associated labels. Labels or annotations are typically only available for a limited amount of the data sample; the larger part of the data sample being unlabelled or not annotated. At step 914, the learning algorithm is run on the partially annotated data sample. From this labeled data, the system can estimate the probability of annotations P(Y), and the probability of documents given an annotation P(X|Y). From the unlabeled data, which is typically the bigger portion of the data, the system can estimate P(X'). This can be a very good estimate of the probability of documents, because of the amount of data available. Using Bayes' law of total probability, the system can also estimate P(X) from P(X|Y) by integrating or summing over all outcomes Y. This estimate is usually not as good because only a limited amount of labeled data is used to estimate P(X|Y). The estimate of P(X|Y) can then be adjusted such that the resulting P(X), from the labeled data, is as close as possible as the estimate of P(X') from the unlabeled data. In other words, the statistical model for P(X|Y) can be adjusted, so $\Sigma_y P(X|Y=y)*P(Y=y)$ is as close to P(X') as desired. The output of the semi-supervised machine learning algorithm, also called a model, contains the adjusted parameters for the decision boundary which better separates semantically equivalent from semantically different documents. After the parameters for the decision boundary have been adjusted, the system returns to step 904 to re-cluster the data with the adjusted decision boundary parameters.

During subsequent passes, for at least the documents evaluated at step 910 annotations are available that indicate whether the documents are semantically equivalent or not. At step 916, the system uses these annotations, to evaluate and display quality metrics showing how accurately the decision boundary is able to tell apart semantically different from semantically equivalent documents. At step 918, it is determined whether the quality metrics are acceptable. This can be done, for example, by having thresholds or other criteria for the quality metrics. If the quality metrics are not acceptable, then control passes back to step 910 where additional documents will be evaluated. If the quality metrics are acceptable, then control passes to block 920 where the process terminates with decision boundary parameters that adequately separate semantically equivalent from semantically different documents.

Figure 10:
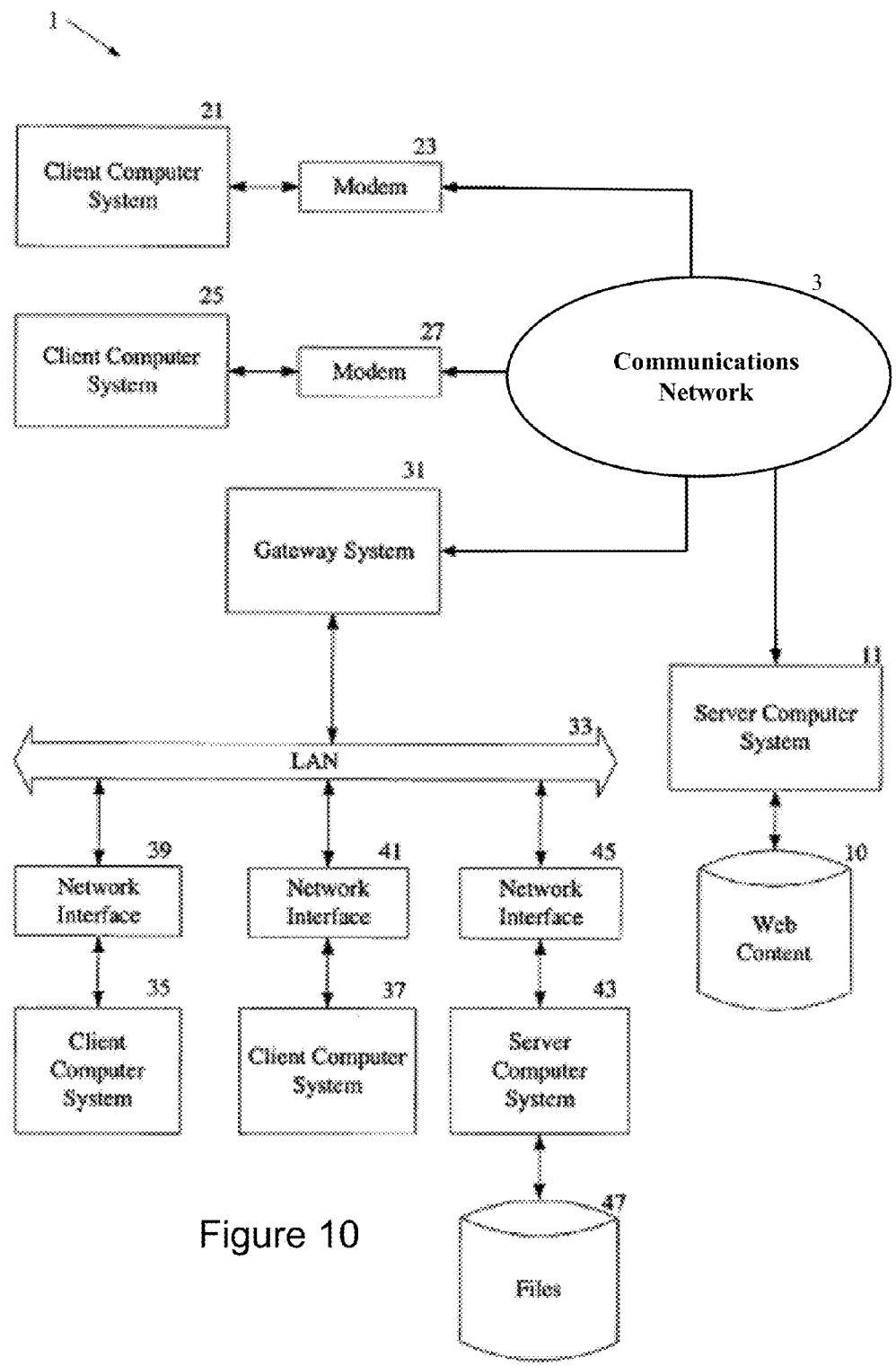
FIG. 10 illustrates an exemplary operating environment comprising several computer systems that are coupled together through a network.
Figure 11:
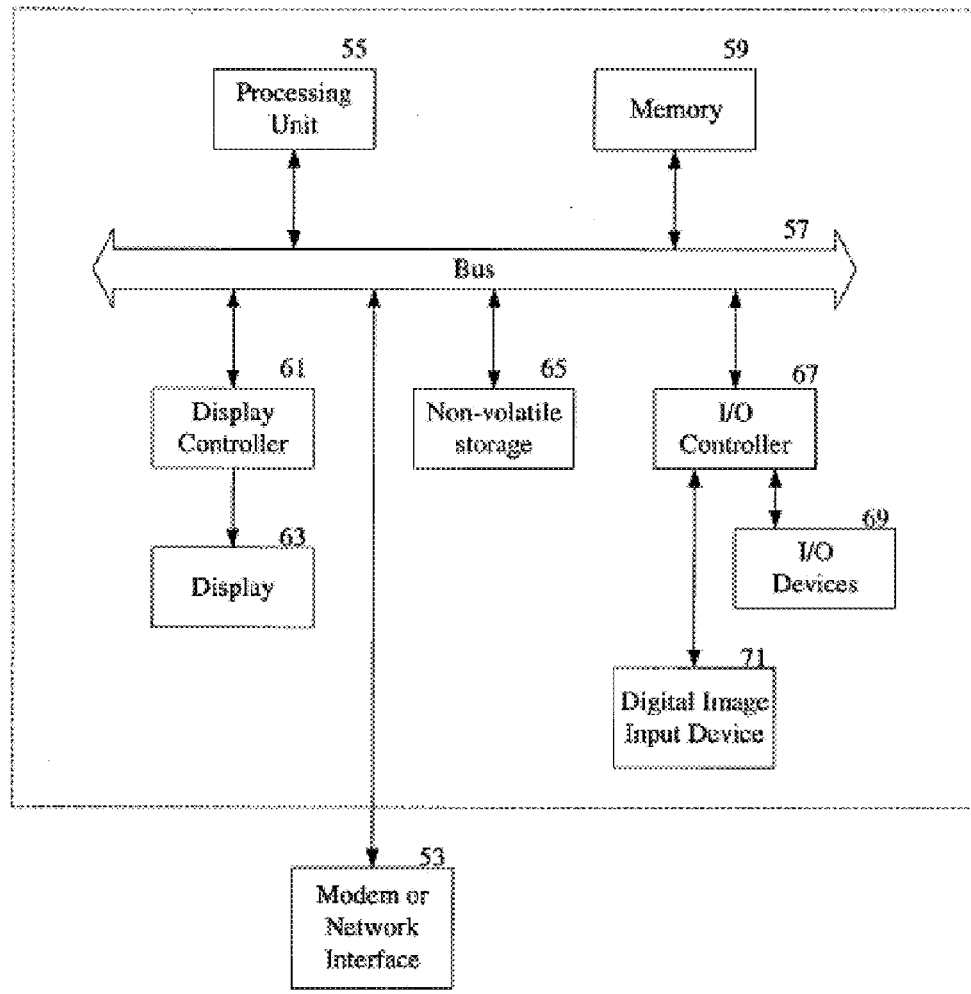
FIG. 11 illustrates an exemplary computer system that can be used as a client computer system or a server computer system or as a web server system.

The following description of FIGS. 10 and 11 is intended to provide an overview of exemplary computer hardware and other operating components suitable for performing the methods of the invention described above. However, it is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network, such as a local area network (LAN), wide-are network (WAN), or over the Internet.

FIG. 10 shows several computer systems 1 that are coupled together through a communications network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet and other networks are well known to those of skill in the art.

Access to the Internet 3 can be provided by Internet service providers (ISP) or by other methods known in the art. Users on client systems, such as client computer systems 21, 25, 35, and 37 obtain access to the Internet which allows users of the client computer systems to exchange data, receive and send messages, documents and other information with other users and systems over the communications network 3. This information can be provided by web servers, such as server computer system 11.

The server computer system 11 is typically at least one computer system which operates as a server computer and is configured to operate with the certain protocols and is coupled to the Internet. The web server computer system 11 is shown coupled to a web content database 10. It will be appreciated that the web server computer system 11 can be multiple computer systems having different software components providing web server functionality and server functionality.

The client computer systems 21, 25, 35, and 37 can each, with the appropriate software, view HTML pages and other data provided by the web server 11. Internet connectivity is provided to the client computer system 21 through a modem interface 23 which can be considered part of the client computer system 21. The client computer system can be a personal computer system, a network computer, a consumer electronic system, a handheld device, or other such electronic computing device. Client computer system 25 is coupled through a modem interface 27 while client computer systems 35 and 37 are part of a LAN. While FIG. 10 shows the interfaces 23 and 27 as generically as a "modem," it will be appreciated that each of these interfaces can be an analog modem, ISDN modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 provides Internet connectivity to the client computer systems 35 and 37. The gateway computer system 31 can be a conventional server computer system. Also, the web server system 11 can be a conventional server computer system. Alternatively, a server computer system 43 can be directly coupled to the LAN 33 through a network interface 45 to provide files 47 and other services to the clients 35, 37, without the need to connect to the Internet 3 through the gateway system 31.

FIG. 11 shows an exemplary computer system that can be used as a client computer system or a server computer system or as a web server system. The computer system 51 interfaces to external systems through a modem or network interface 53. It will be appreciated that the modem or network interface 53 can be considered to be part of the computer system 51. This interface 53 can be an analog modem, ISDN modem, cable modem, token ring interface, satellite transmission interface, or other interfaces for coupling a computer system to other computer systems. The computer system 51 includes a processing unit 55, which can be a conventional microprocessor. Memory 59 is coupled to the processor 55 by a bus 57. The bus 57 couples the processor 55 to the memory 59 and also to non-volatile storage 65 and to display controller 61 and to the input/output (I/O) controller 67. The display controller 61 controls a display on a display device 63 which can be a cathode ray tube (CRT), liquid crystal display (LCD) or other type of display device. The input/output devices 69 can include a keyboard, disk drives, printers, a scanner, and other input and output devices, including a mouse or other pointing device. A digital image input device 71 can be a digital camera which is coupled to an I/O controller 67 in order to allow images from the digital camera to be input into the computer system 51. The non-volatile storage 65, an example of a "computer-readable storage medium" and a "machine-readable storage medium", is often a magnetic hard disk, an optical disk, a USB drive or another form of storage for large amounts of data. Some of this data is often written, by a direct memory access process, into memory 59 during execution of software in the computer system 51. One of skill in the art will recognize that the terms "computer-readable medium" and "machine-readable medium" include any type of "computer-readable storage medium" and "machine-readable storage medium" (e.g., storage device) that is accessible by the processor 55.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

It will also be appreciated that the computer system 51 is controlled by operating system software which includes a file management system, such as a disk operating system, which is part of the operating system software. One example of operating system software with its associated file management system software is the Windows family of operating systems from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

While this invention has been described as having an exemplary design, the present invention may be further modified within the spirit and scope of this disclosure. This application is therefore intended to cover any variations, uses, or adaptations of the invention using its general principles.

We claim:

1. A computer automated method of clustering a plurality of documents, each document including input space data and output space data, the method comprising:
   for each document in the plurality of documents, reading the input space data of the document from memory or storage;
   computing an input space similarity measure between the document and other documents of the plurality of documents using a computing device;
   aggregating the document into a first plurality of clusters based on the input space similarity measure; storing the first plurality of clusters in a database;
   for each cluster in the first plurality of clusters, reading the output space data of the documents in the current cluster of the first plurality of clusters;
   computing an output space similarity measure for the plurality of documents in the current cluster using the computing device; and
   maintaining or subdividing the current cluster in the first plurality of clusters based on the output space similarity measure, wherein aggregating the documents into a first plurality of clusters comprises:
   forming a hierarchical tree based on the input space similarity measure, the hierarchical tree having a root node covering all of the plurality of documents, branching into intermediate nodes covering subsets of the plurality of documents, and branching into leaf nodes covering individual documents of the plurality of documents, the hierarchical tree including a lead node for each document of the plurality of documents;

computing a node similarity measure for each node of the hierarchical tree;

retrieving a node similarity threshold from memory or storage, the node similarity threshold being less than the node similarity measure of the leaf nodes of the hierarchical tree;

performing a graph traversal search over each node of the hierarchical tree starting with the root node to form a forest of sub-trees of the hierarchical tree by:
comparing the node similarity measure for the current node in the graph traversal search with the node similarity threshold; and if the node similarity measure of the current node is equal to or greater than the node similarity threshold, storing the current node as a cluster in the first plurality of clusters, not proceeding further down the depth of the current branch of the hierarchical tree, and continuing the graph traversal search on the next branch of the hierarchical tree; if the node similarity measure of the current node is less than the node similarity threshold, continuing the graph traversal search further down the current branch of the hierarchical tree.

2. The method of claim 1, wherein the input space similarity measure is a textual similarity measure.

3. The method of claim 2, wherein computing an input space similarity measure comprises generating a document versus word matrix.

4. The method of claim 3, wherein computing an input space similarity measure further comprises: retrieving a stopwords list from memory or storage; and stripping away words from the input space data of each document using the stopwords list prior to generating the document versus word matrix.

5. The method of claim 1, wherein computing an output space similarity measure and maintaining or subdividing the current cluster in the first plurality of clusters based on the output space similarity measure comprises: retrieving an output space similarity threshold from memory or storage;

for each cluster of the first plurality of clusters, performing a cluster subdividing process of: computing an output space similarity measure for the current cluster; if the output space similarity measure of the current cluster is equal to or greater than the output space similarity threshold, maintaining the current cluster and continuing the cluster subdividing process with the next cluster of the first plurality of clusters;

if the output space similarity measure of the current cluster is less than the output space similarity threshold, determining a type and distribution of the output space data for the documents in the current cluster, subdividing the current cluster into a refined plurality of clusters based on the output space type and distribution, replacing the current cluster in the first plurality of clusters with the refined plurality of clusters; and continuing the cluster subdividing process with the refined plurality of clusters in the first plurality of clusters.

6. The method of claim 5, further comprising performing the following combined selection process for each cluster of the first plurality of clusters:

computing an input space similarity measure for the current cluster; computing an output space similarity measure for the current cluster; computing a combined selection value for the current cluster as a function of the input and output space similarity measures;

if the combined selection value of the current cluster is equal to or greater than a combined selection criteria, maintaining the current cluster in the first plurality of clusters; and if the combined selection value of the current cluster is less than the combined selection criteria, subdividing the current cluster of the first plurality of clusters based on the input and output space similarity measures; replacing the current cluster with the subdivided clusters, and repeating the combined selection process for each of the subdivided clusters.

7. The method of claim 1, further comprising performing the following combined selection process for each cluster of the first plurality of clusters:

computing an input space similarity measure for the current cluster; computing an output space similarity measure for the current cluster; computing a combined selection value for the current cluster as a function of the input and output space similarity measures;

if the combined selection value of the current cluster is equal to or greater than a combined selection criteria, maintaining the current cluster in the first plurality of clusters; and if the combined selection value of the current cluster is less than the combined selection criteria, subdividing the current cluster of the first plurality of clusters based on the input and output space similarity measures; replacing the current cluster with the subdivided clusters, and repeating the combined selection process for each of the subdivided clusters.

8. The method of claim 1, wherein computing an output space similarity measure comprises determining an output space type for each of the plurality of documents in the cluster; and maintaining or subdividing the current cluster based on the output space similarity measure comprises:

maintaining the current cluster when the output space type is the same for all of the plurality of documents in the current cluster, and subdividing the current cluster into multiple subdivided clusters when the output space types are different for the plurality of documents in the current cluster, where the output space types are the same for all of the documents in each of the subdivided clusters.

9. The method of claim 8, wherein computing an output space similarity measure further comprises determining an output space distribution for the plurality of documents in the cluster; and maintaining or subdividing the current cluster based on the output space similarity measure comprises:

maintaining the current cluster when the output space distribution includes all of the plurality of documents in the current cluster, and subdividing the current cluster into multiple subdivided clusters when the output space distribution does not include all of the plurality of documents in the current cluster, where an output space distribution for each subdivided cluster includes all of the documents in that subdivided cluster.

10. The method of claim 1, wherein the output space similarity measure is a numeric similarity measure.

11. A computer automated method of clustering a plurality of documents, each document including input space data and output space data, the method comprising:

for each document in the plurality of documents, reading the input space data of the document from memory or storage;

computing an input space similarity measure between the document and other documents of the plurality of documents using a computing device;

aggregating the documents into a first plurality of clusters based on the input space similarity measure;

storing the first plurality of clusters in a database; for each cluster in the first plurality of clusters performing the following refining process, reading the input and output space data of the documents in the cluster;

computing an input space similarity measure for the plurality of documents in the cluster using the computing device; computing an output space similarity measure for the plurality of documents in the cluster using the computing device;

computing a combined similarity measure based on the input and output space similarity measures;

maintaining or subdividing the cluster based on the combined similarity measure, wherein maintaining or subdividing the cluster based on the combined similarity measure comprises comparing the combined similarity measure to a combined selection criteria; if the combined similarity measure meets the combined selection criteria, maintaining the cluster in the first plurality of clusters; and if the combined similarity measure does not meet the combined selection criteria, subdividing the cluster based on the input and output space similarity measures; replacing the cluster in the first plurality of clusters with the subdivided clusters, and repeating the refining process for each of the subdivided clusters.

12. The method of claim 11, wherein aggregating the documents into a first plurality of clusters comprises: forming a hierarchical tree based on the input space similarity measure, the hierarchical tree having a root node covering all of the plurality of documents, branching into intermediate nodes covering subsets of the plurality of documents, and branching into leaf nodes covering individual documents of the plurality of documents, the hierarchical tree including a leaf node for each document of the plurality of documents;

computing a node similarity measure for each node of the hierarchical tree; retrieving a node similarity threshold from memory or storage, the node similarity threshold being less than the node similarity measure of the leaf nodes of the hierarchical tree;

performing a graph traversal search over each node of the hierarchical tree starting with the root node to form a forest of sub-trees of the hierarchical tree by: comparing the node similarity measure for the current node in the graph traversal search with the node similarity threshold;

if the node similarity measure of the current node is equal to or greater than the node similarity threshold, storing the current node as a cluster in the first plurality of clusters, not proceeding further down the depth of the current branch of the hierarchical tree, and continuing the graph traversal search on the next branch of the hierarchical tree;

if the node similarity measure of the current node is less than the node similarity threshold, continuing the graph traversal search further down the current branch of the hierarchical tree.

13. The method of claim 12, wherein the input space similarity measure is a textual similarity measure.

14. The method of claim 13, wherein computing an input space similarity measure comprises generating a document versus word matrix.

15. The method of claim 14, wherein computing an input space similarity measure further comprises: retrieving a stopwords list from memory or storage; and stripping away words from the input space data of each document using the stopwords list prior to generating the document versus word matrix.

16. The method of claim 13, wherein the output space similarity measure is a numeric similarity measure.

17. A computer automated method of clustering a plurality of documents, each document including input space data and output space data, the method comprising: for each document in the plurality of documents, reading the input and output space data of the document from memory or storage;

computing an input space similarity measure between the document and other documents of the plurality of documents using a computing device;

computing an output space similarity measure between the document and other documents of the plurality of documents using the computing device;

aggregating the documents into a plurality of clusters based on the input and output space similarity measures;

storing the plurality of clusters in memory or storage, wherein aggregating the documents into a plurality of clusters comprises:

forming a hierarchical tree based on the input and output space similarity measures, the hierarchical tree having a root node covering all of the plurality of documents, branching into intermediate nodes covering subsets of the plurality of documents, and branching into leaf nodes covering individual documents of the plurality of documents, the hierarchical tree including a leaf node for each document of the plurality of documents;

computing a node similarity measure for each node of the hierarchical tree; retrieving a node similarity threshold from memory or storage, the node similarity threshold being less than the node similarity measure of the leaf nodes of the hierarchical tree;

performing a graph traversal search over each node of the hierarchical tree starting with the root node to form a forest of sub-trees of the hierarchical tree by: comparing the node similarity measure for the current node in the graph traversal search with the node similarity threshold; and if the node similarity measure of the current node is equal to or greater than the node similarity threshold, storing the current node as a cluster in the plurality of clusters, not proceeding further down the depth of the current branch of the hierarchical tree, and continuing the graph traversal search on the next branch of the hierarchical tree; if the node similarity measure of the current node is less than the node similarity threshold, continuing the graph traversal search further down the current branch of the hierarchical tree.

\* \* \* \* \*